United States Patent
Suzuki et al.

(10) Patent No.: US 8,523,293 B2
(45) Date of Patent: Sep. 3, 2013

(54) HYDRAULIC BRAKE APPARATUS

(75) Inventors: Atsushi Suzuki, Kariya (JP); Hideki Yamamoto, Handa (JP); Shigemitsu Nohira, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1407 days.

(21) Appl. No.: 12/199,296

(22) Filed: Aug. 27, 2008

(65) Prior Publication Data

US 2009/0058181 A1 Mar. 5, 2009

(30) Foreign Application Priority Data

Aug. 28, 2007 (JP) .................................. 2007-220586
Jun. 19, 2008 (JP) .................................. 2008-160590

(51) Int. Cl.
*B60T 8/34* (2006.01)
(52) U.S. Cl.
USPC .................. 303/113.1; 303/114.1; 303/114.2; 188/358; 188/359; 60/591
(58) Field of Classification Search
USPC ................ 303/114.1, 114.2, 113.1; 188/358, 188/359; 60/591
See application file for complete search history.

(56) References Cited

U.S. PATENT DOCUMENTS

| | | | |
|---|---|---|---|
| 3,074,383 A * | 1/1963 | Schnltz | 91/391 R |
| 3,712,057 A * | 1/1973 | Aiki et al. | 60/547.1 |
| 3,942,844 A * | 3/1976 | Inada et al. | 303/122.13 |
| 4,743,071 A * | 5/1988 | Iwamoto | 303/3 |
| 4,898,430 A * | 2/1990 | Becker-Endrigkeit et al. | 303/84.2 |
| 5,056,313 A * | 10/1991 | Venetos et al. | 60/562 |
| 5,449,225 A * | 9/1995 | Burgdorf et al. | 303/113.1 |
| 5,899,068 A * | 5/1999 | Nishii et al. | 60/562 |
| 6,276,137 B1 * | 8/2001 | Kottmyer et al. | 60/591 |
| 6,296,324 B1 * | 10/2001 | Nishii et al. | 303/11 |

FOREIGN PATENT DOCUMENTS

| | | |
|---|---|---|
| JP | 59-137247 A | 8/1984 |
| JP | 60-142155 U | 9/1985 |
| JP | 64-22668 A | 1/1989 |
| JP | 09-315288 A | 12/1997 |
| JP | 11-180290 A | 7/1999 |
| JP | 2005-226695 A | 8/2005 |

OTHER PUBLICATIONS

Japanese Office Action issued Mar. 29, 2012 by the Japanese Patent Office in Japanese Patent Application No. 2008-160590 and partial English translation thereof.

* cited by examiner

*Primary Examiner* — Bradley King
*Assistant Examiner* — Mahbubur Rashid
(74) *Attorney, Agent, or Firm* — Buchanan Ingersoll & Rooney PC (57) ABSTRACT

A hydraulic brake apparatus includes a master cylinder pressurizing brake fluid in a pressure chamber and outputting a hydraulic pressure to a wheel cylinder of a first brake circuit, and a pressure control valve controlling a hydraulic pressure of an auxiliary hydraulic pressure source outputting the controlled hydraulic pressure to a wheel cylinder of a second brake circuit, wherein a master cylinder piston includes a first passage which hydraulically connects the pressure chamber and a reservoir, and a switching valve which closes and opens the first passage, and wherein a throttle means and a check valve, which allows the brake fluid to travel only from the reservoir to the pressure chamber, are hydraulically provided in parallel with each other at the first passage at a position between the switching valve and the reservoir.

20 Claims, 7 Drawing Sheets

HYDRAULIC BRAKE APPARATUS

CROSS REFERENCE TO RELATED APPLICATIONS

This application is based on and claims priority under 35 U.S.C. §119 to Japanese Patent Applications 2007-220586, filed on Aug. 28, 2007, and 2008-160590, filed on Jun. 19, 2008, the entire contents of which are incorporated herein by reference.

FIELD OF THE INVENTION

The present invention relates to a hydraulic brake apparatus.

BACKGROUND

A known hydraulic brake apparatus for a vehicle including an auxiliary hydraulic pressure source and a pressure control valve, in addition to a master cylinder, is disclosed in JP1997-315288A (which is referred to as reference 1 hereinbelow). The hydraulic brake apparatus according to reference 1 is structured so that hydraulic pressure generated at a pressure chamber of a master cylinder is supplied to wheel cylinders of a first brake circuit and that hydraulic pressure of an auxiliary hydraulic pressure source is controlled by a pressure control valve in response to an output pressure of the master cylinder and then, the controlled hydraulic pressure is supplied to wheel cylinders of a second brake circuit.

The hydraulic brake apparatus according to reference 1 includes the master cylinder piston having first and second pistons. The master cylinder pistons pressurize the hydraulic pressure at the pressure chamber. The first piston is connected to a brake operation member and the second piston is fitted at an outer circumference of the first piston so as to be slidable in an axial direction thereof. In a case where the hydraulic pressure is normally supplied from the pressure control valve to the master cylinder, the second piston receives the output hydraulic pressure generated by the pressure control valve at a back portion (a portion corresponding to the brake operation member) and generates thrusting force which functions as driving assist force of the mater cylinder pistons. The output pressure of the pressure control valve is supplied to the wheel cylinders via electromagnetic valves controlling the hydraulic pressure.

According to the hydraulic brake apparatus in reference 1, the output hydraulic pressure of the master cylinder is determined depending on an operating stroke of the brake operation member, and not on an operating speed of the brake operation member. However, the pressure control valve is configured so that a control piston which receives the output hydraulic pressure of the master cylinder moves a spool to a position in response to the output pressure and the pressure control valve controls and outputs the hydraulic pressure supplied from the auxiliary hydraulic pressure source by the movement of the spool. Thus, because an influence of an orifice effect occurs at an inside of the electromagnetic valves or the like for controlling hydraulic pressure, a response to the operation of the brake operation member is delayed. As a result, when the brake operation member is operated fast, pressurization of the wheel cylinder pressure is delayed in the circuit at which the pressure control valve is provided and the operating stroke of the brake operation member relative to the wheel cylinder pressure becomes longer than when the brake operation member is operated slower.

In other words, a hydraulic pressure balance between the first brake circuit applying the output hydraulic pressure of the master cylinder and the second brake circuit applying the output hydraulic pressure of the pressure control valve changes depending on the operating speed of the brake operation member (brake pedal depressing speed). For example, the brake operation feeling and brake effectiveness vary depending on the way a driver depresses the brake pedal. Accordingly, the driver feels that the brake is not responding to his/her operation at an initial operation, or that the brake is responding to his/her operation with delay. Further, the brake effectiveness is deteriorated by the delay of pressurization of the wheel cylinders of the second circuit.

In order to improve the brake operation feeling and the brake effectiveness, the output pressure of the pressure control valve may be increased relative to the output pressure of the master cylinder, however, a thickness of a cylinder body may be increased for pressure resistance, which results in increasing a size of the cylinder body.

A need thus exists for a hydraulic brake apparatus which is not susceptible to the drawback mentioned above.

SUMMARY OF THE INVENTION

According to an aspect of the present invention, a hydraulic brake apparatus includes a master cylinder pressurizing brake fluid in a pressure chamber by means of a master cylinder piston so as to generate hydraulic pressure in response to an operation stroke of a brake operation member and outputting the hydraulic pressure to a wheel cylinder of a first brake circuit, and a pressure control valve controlling a hydraulic pressure of an auxiliary hydraulic pressure source in response to the hydraulic pressure in the pressure chamber and outputting the controlled hydraulic pressure to a wheel cylinder of a second brake circuit, wherein the master cylinder piston includes a first passage which hydraulically connects the pressure chamber and a reservoir, and a switching valve which closes the first passage when the master cylinder piston moves in a forward direction of pressurizing and which opens the first passage when the master cylinder piston returns in a rearward direction opposite from the forward direction, and wherein a throttle means and a check valve, which allows the brake fluid to travel only from the reservoir to the pressure chamber, are hydraulically provided in parallel with each other at the first passage at a position between the switching valve and the reservoir.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

[First Embodiment]

Figure 1:
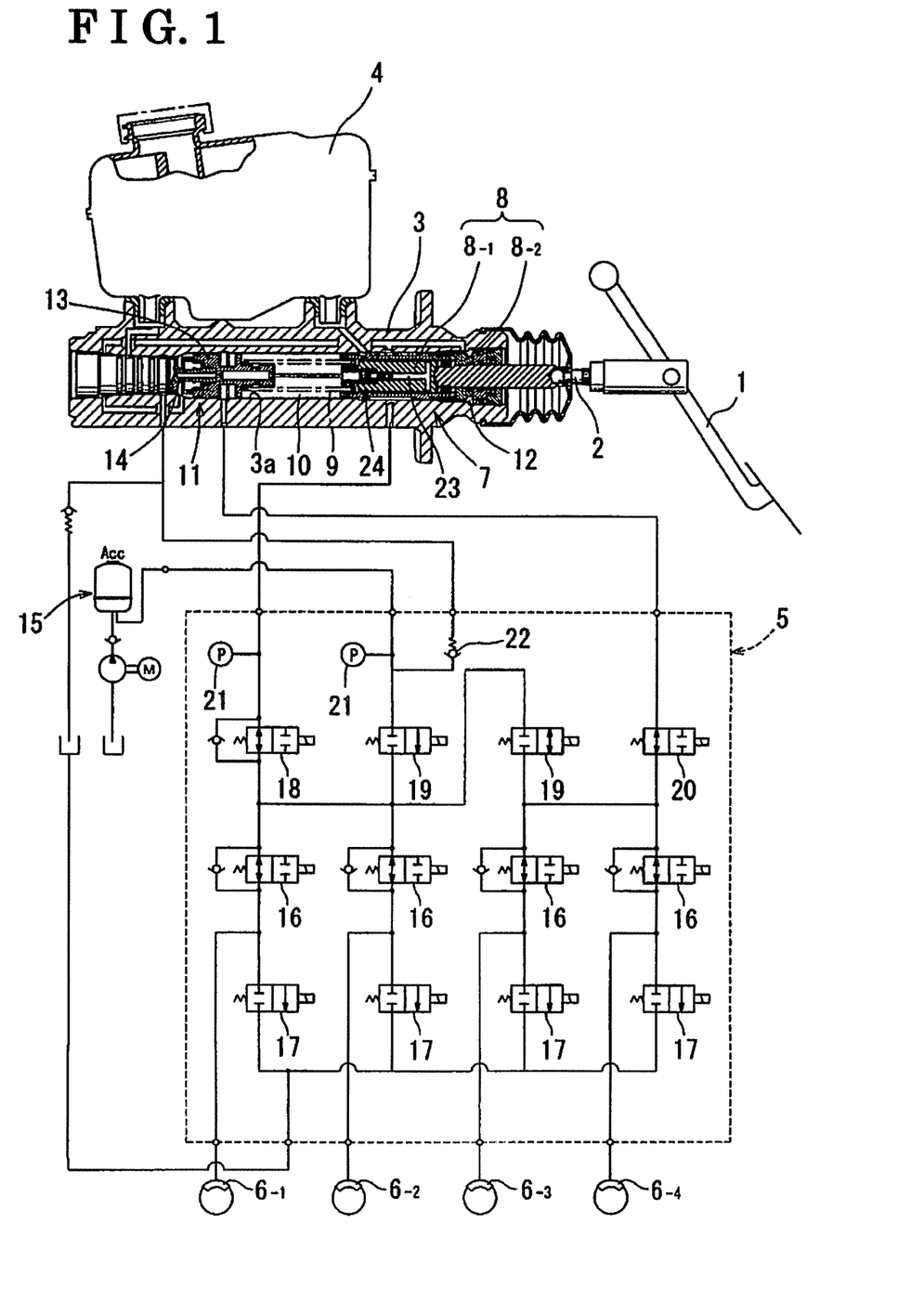
FIG. 1 illustrates a whole structure of a hydraulic brake apparatus according to a first embodiment.

Embodiments of the hydraulic brake apparatus according to the present invention is described hereinbelow with reference to FIGS. 1 to 9 of the attached drawings. FIG. 1 illustrates an entire structure of the hydraulic brake apparatus of the embodiments. FIG. 1 illustrates a brake operation member (which is illustrated as a brake pedal in FIG. 1), an input rod 2, a cylinder body 3, a reservoir 4, a hydraulic pressure control unit 5 and wheel cylinders 6-1, 6-2, 6-3 and 6-4 connected to the corresponding wheels of a vehicle.

Figure 2:
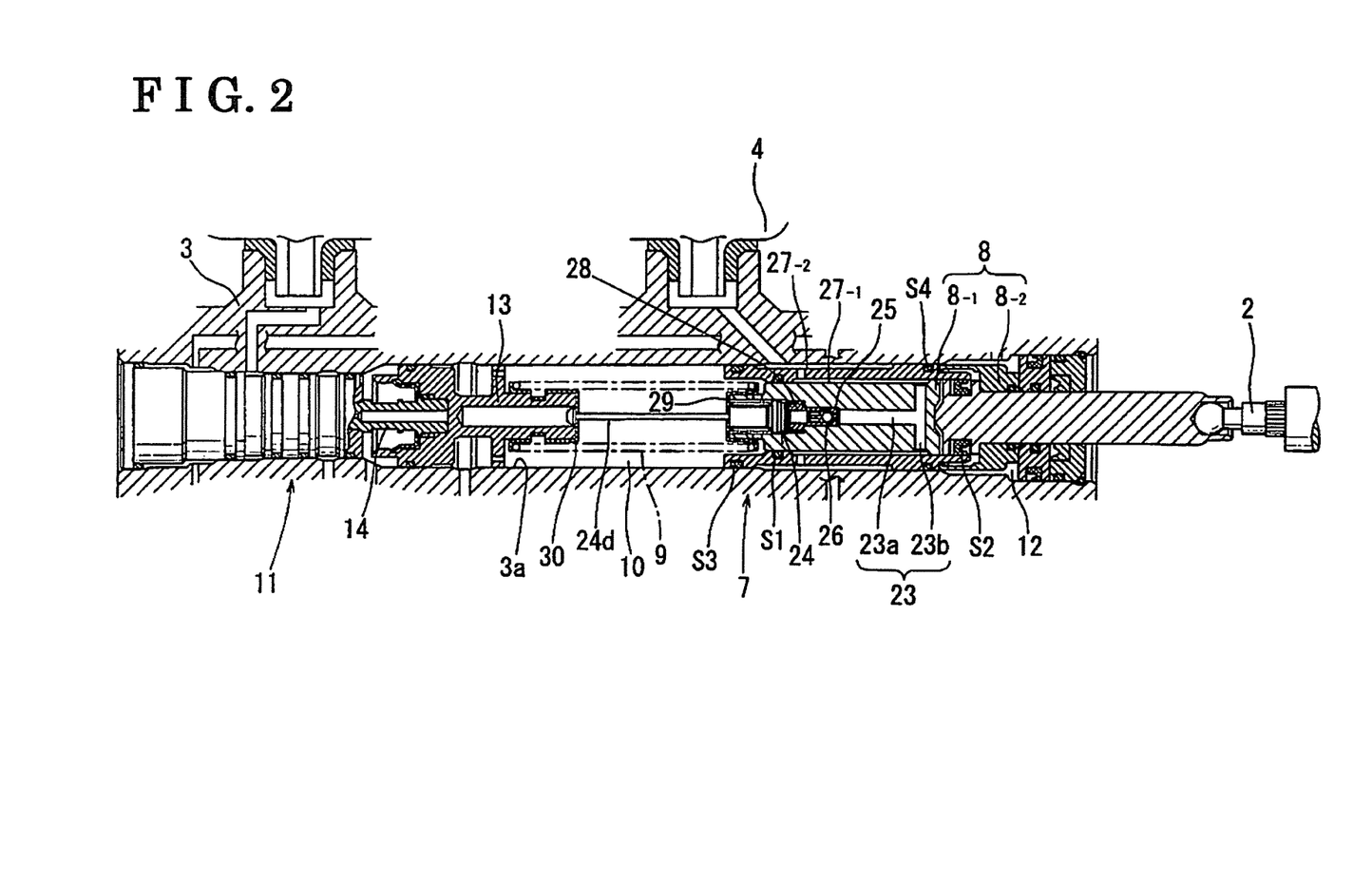
FIG. 2 is an enlarged cross-sectional view illustrating the hydraulic brake apparatus according to the first embodiment.

As illustrated also in FIG. 2, a master cylinder 7 and a pressure control valve 11 are assembled at a cylinder hole 3a provided at the cylinder body 3. The master cylinder 7 includes master cylinder pistons 8 and a spring 9 for returning the master cylinder pistons 8 to an initial position. The master cylinder 7 generates hydraulic pressure by pressurizing brake fluid within a pressure chamber 10 by means of the master cylinder piston 8. According to a brake system of the embodiment, in a case where a usual braking operation is executed, the hydraulic pressure generated at the pressure chamber 10 is supplied to the wheel cylinders 6-1 and 6-2 of a first brake circuit (for example a circuit connected to front wheels).

Hereinbelow, directions such as front and back, front and rear, and forward and backward correspond to left and right sides of the attached drawings, respectively. The master cylinder piston 8 is formed by a first piston 8-1 and a second piston 8-2 that are coaxially aligned. The second piston 8-2 is fitted at an outer circumference of the first piston 8-1 so as to be slidable in the axial direction thereof and the second piston 8-2 engages with the first piston 8-1 when operated towards a forward direction (towards the left side in FIG. 2). When a power chamber 12 is normally supplied with the hydraulic pressure from the pressure control valve 11, the second piston 8-2 receives the output hydraulic pressure of the pressure control valve 11 applied to the power chamber 12 at a back portion of the second piston 8-2 (a right side in FIG. 2) and generates thrusting force that functions as driving assist force of the master cylinder piston 8.

For the pressure control valve 11, a control piston 13 which receives output hydraulic pressure of the master cylinder 7 (the hydraulic pressure at the pressure chamber 10) moves a spool 14 and thereby controlling and outputting hydraulic pressure supplied by an auxiliary hydraulic pressure source 15. The spool 14 opens a valve portion by moving to a position in response to the output hydraulic pressure of the master cylinder 7 and controls an opening degree of the valve portion. As a result, the hydraulic pressure supplied from the auxiliary hydraulic pressure source 15 is controlled to a level corresponding to the output hydraulic pressure of the master cylinder 7 and the controlled hydraulic pressure is outputted. The output hydraulic pressure of the pressure control valve 11 is supplied to the wheel cylinders 6-3, 6-4 of a second circuit.

The auxiliary hydraulic pressure source 15 of the embodiment is included in the hydraulic pressure control unit 5, and a motor driven pump having an accumulator serves as the auxiliary hydraulic pressure source 15.

A detailed description of the master cylinder 8 and the pressure control valve 11 is not given because the structure and function thereof are substantially the same as that of the reference 1.

The hydraulic pressure control unit 5 includes, other than the auxiliary hydraulic pressure source 15, pressure increase electromagnetic valves 16 (functioning also as check valves) and pressure decrease electromagnetic valves 17, both of which are connected to the corresponding wheel cylinders, electromagnetic valves 18, 19 and 20 for switching circuits and a communicating state of the brake fluid, pressure sensors 21 for detecting hydraulic pressure of each of the circuits and a first check valve 22. However, the hydraulic pressure control unit 5 illustrated in FIGS. 1-9 is an example and a control unit which has a different structure of circuits may be used.

As illustrated in FIGS. 1, 2 3A and 3B, the first piston 8-1 includes a first passage 23 within which brake fluid flows between the pressure chamber 10 and the reservoir 4, a switching valve 24 which opens when the first piston 8-1 moves forward along the first passage 23 and which closes when the first piston 8-1 returns (moves backwards to the initial position), a throttle 25 (a throttle means) and a second check valve 26 (a check valve).

Figure 3A:
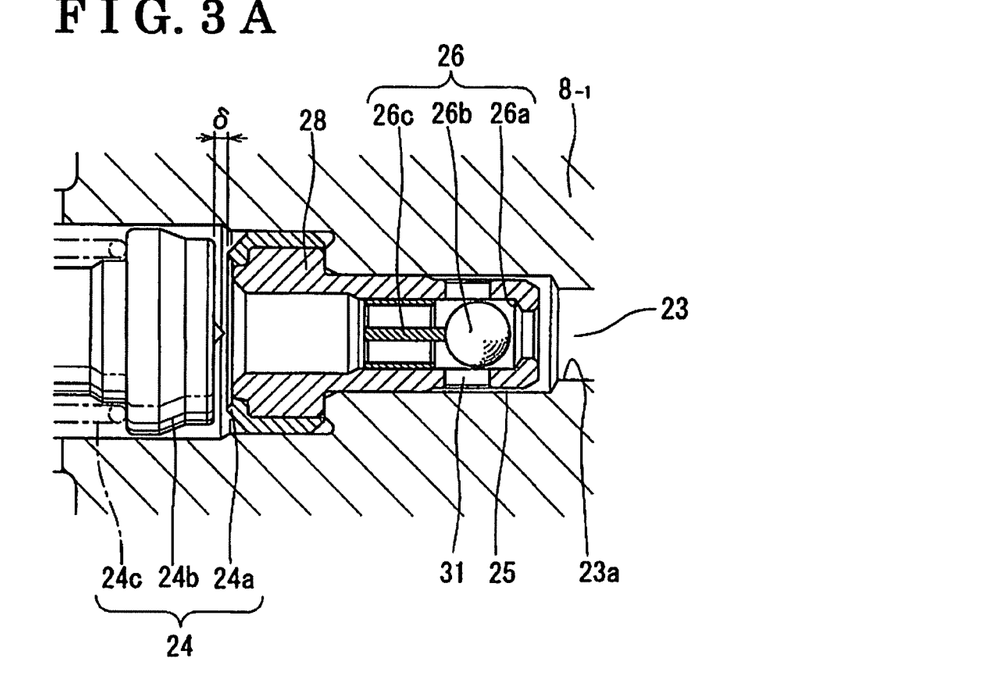
FIG. 3A is a further enlarged cross-sectional view illustrating a throttle and first and second check valves provided inside a master cylinder illustrated in FIG. 2 according to the first embodiment.
Figure 3B:
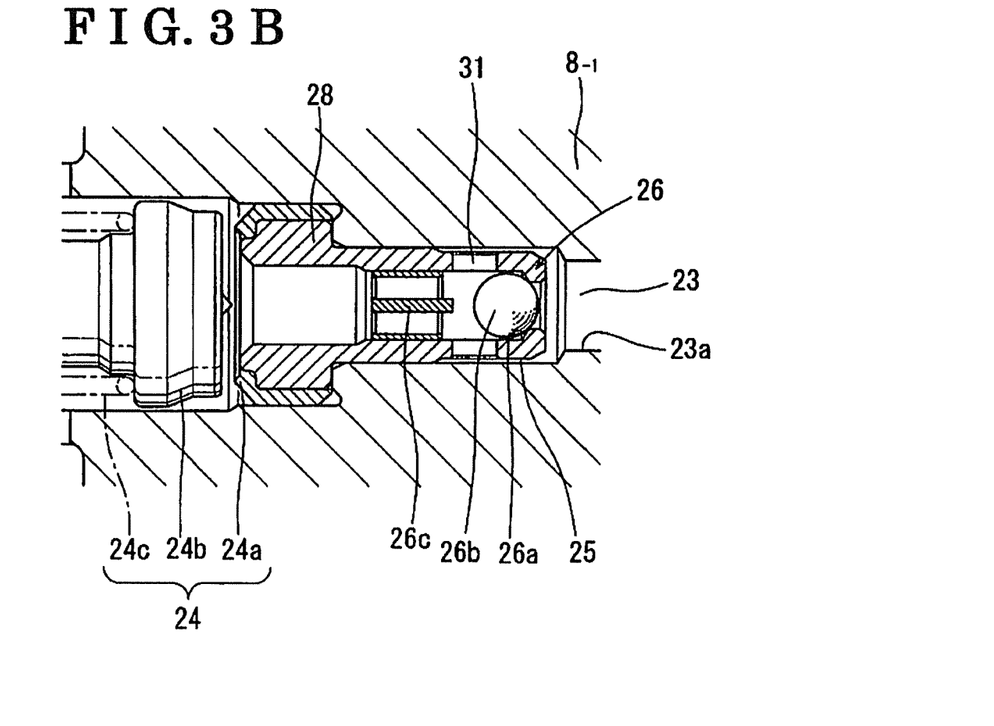
FIG. 3B is a cross-sectional view illustrating the first and second check valves illustrated in FIG. 3A when being closed according to the first embodiment.

The first passage 23 includes a main hole 23a and a branch hole 23b. The main hole 23a is provided at a center portion of the first piston 8-1 so as to form an opening at a front portion of the first piston and is provided at a center portion of an opening portion of the first piston 8-1. The branch hole 23b is provided so as to extend from the main hole 23a in the outer circumference direction of the first piston 8-1. First and second circular fluid chambers 27-1 and 27-2 are provided at the master cylinder 7. Each of front and back sides of the first circular fluid chamber 27-1 in an axial direction is sealed by each of first and second seal portions S1 and S2 which is provided between the outer circumference of the first piston 8-1 and an inner circumference of the second piston 8-2. Likewise, each of front and back sides of the second circular fluid chamber 27-2 in an axial direction is sealed by each of third and fourth seal portions S4 and S5 which is provided between an outer circumference of the second piston 8-2 and an inner circumference of the cylinder hole 3a. The branch hole 23b opens towards the first circular fluid chamber 27-1 and the first passage 23 is connected to the reservoir 4 via the first and second circular fluid chambers 27-1 and 27-2 so that the brake fluid travels therethrough.

As illustrated in FIGS. 2 and 3, a sleeve 28 (a sleeve having one end facing the pressure chamber and the other end) is fluid-tightly inserted into the main hole 23 provided at the first piston 8-1 so that a front portion of the sleeve 28 faces the pressure chamber 10. The switching valve 24 includes a first valve seat (a valve seat of the switching valve) 24a formed at a front portion (one end) of the sleeve 28, a first valve body (a valve body of the switching valve) 24b provided so as to move towards and away from the first valve seat 24a and a biasing means (a spring) 24c which supports the first valve body 24b against the first valve seat 24a. One end portion of the biasing means 24c is supported by a retainer 29 (see FIG. 2) which is attached to the first piston 8-1. A rod 24d is provided at the valve body 24b. When the master cylinder piston 8 and the control piston 13 are located at a returning end position, the valve body 24b is retained via the rod 24d at an opening position by means of a retainer 30 (see FIG. 2) attached to the control piston 13. A symbol δ in FIG. 3A represents an idle stroke of the master cylinder 7. When the master cylinder piston 8 moves forward to a pressurizing direction (i.e. when the master cylinder piston 8 is pushed towards the left side in FIG. 3A) until located at a position where the idle stroke is zero, the switching valve 24 is closed, thereby interrupting the flow of brake fluid between the pressure chamber 10 and the reservoir 4.

Figure 8:
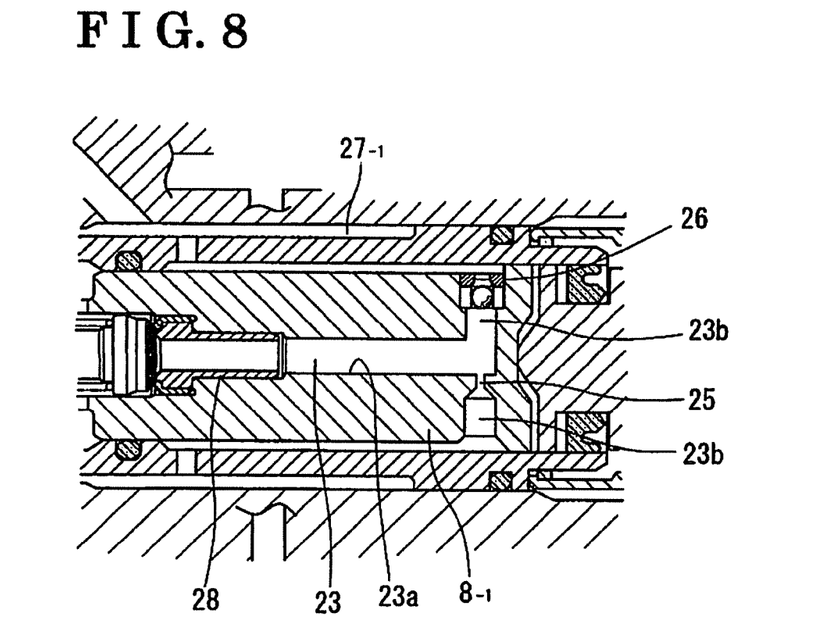
FIG. 8 is a cross-sectional view illustrating the throttle and the second check valve inside the master cylinder a fifth embodiment.

A clearance is formed between a rear outer circumference of the sleeve 28 and an inner circumference of the main hole 23a, and the clearance whose cross section is small in size functions as the throttle 25. The second check valve 26 is provided within the sleeve 28. The second check valve 26 includes a second valve seat (a valve seat of the check valve) 26a provided at an rear end portion of an inner surface of the sleeve 28, a second valve body (a valve body of the check valve) 26b which opens and closes a passage provided between the second valve seat 26a and the second valve body 26b (which is illustrated in a sphere in the drawings as a floating valve body) and a stopper 26c which restricts a moving amount of the second valve body 26b in a direction in which the second check valve 26 opens. The second check valve 26 allows the brake fluid to travel only from the reservoir 4 to the pressure chamber 10. Connecting holes 31 are provided at the sleeve 28 at a position hydraulically between the check valve 26 and the pressure chamber 10, more specifically, the connecting holes 31 are provided at the sleeve 28 at a position hydraulically between the pressure chamber 10 and a contacting portion where the second valve seat 26a and the second valve body 26b contact each other. FIG. 8 and FIGS. 3A and 3B illustrate substantially the same structured circuit, and as illustrated in FIG. 8, the throttle 25 and the second check valve 26 are hydraulically provided in parallel with each other.

According to the hydraulic brake apparatus structured in the above-described manner, when the brake operation member 1 (see FIG. 1) is operated fast, the second valve body 26b, which receives the hydraulic pressure generated at the pressure chamber 10, closes as illustrated in FIG. 3B. As a result, the brake fluid, which travels from the pressure chamber 10 to the reservoir 4, receives outflow resistance at the throttle 25 when traveling therethrough. Thus, the hydraulic pressure within the pressure chamber 10 relative to a predetermined amount of operation stroke of the brake operation member 1 is increased compared to that of a hydraulic brake apparatus which does not include a throttle. Accordingly, operation of the pressure control valve 11 becomes faster and the non-effective stroke of the master cylinder 7 is reduced, therefore, the changes of the brake feeling occurring due to fluctuation in operation speed is restricted. As a result, when the brake operation member 1 is operated fast, the driver may not feel that the brake is not responding to his/her operation at the initial operation or that the brake is responding to his/her operation with delay.

Further, according to the hydraulic brake apparatus, in which a driving assist force of the master cylinder piston 8 is generated when the non-effective stroke of the master cylinder 7 is shortened, pressurization at wheel cylinders 6-1, 6-2, 6-3 and 6-4 in response to pressurization at the master cylinder piston 8 is improved at the initial operation, therefore, the brake is effectively operated and brake stopping distance is shortened.

Furthermore, in a state in which the driver does not operate the brake operation member 1, when a hydraulic pressure control based on a command of an electronic control device is executed so that the auxiliary hydraulic pressure source 15 sucks the brake fluid from the reservoir 4, the second check valve 26 opens as illustrated in FIG. 3A and the brake fluid travels smoothly from the reservoir 4 to the auxiliary hydraulic pressure source 15 without traveling though the throttle 25, therefore pressurization at wheel cylinders 6-1, 6-2, 6-3 and 6-4 in response to the master cylinder piston 8 is surely achieved.

Effects and advantages according to the first embodiment will be described hereinbelow.

The first passage 23 includes the main hole 23a and the branch hole 23b provided at the first piston 8-1 and the brake fluid travels through the first passage 23 towards the reservoir 4 via the first and second circuit fluid chambers 27-1 and 27-2 which are provided between the first piston 8-1 and the outer circumference of the second piston 8-2. The throttle 25 and the second check valve 26 are provided between the first seal portion S1 and the second seal portion S2, therefore, a length of the hydraulic brake apparatus may not be elongated.

As the first valve seat 24a is formed at the sleeve 28, the first valve seat 24a is easily manufactured, which allows to form the throttle 25 by utilizing the clearance at the outer circumference of the sleeve 28.

The second check valve 26 is provided inside the master cylinder piston 8. Therefore, the hydraulic pressure applied to the first and second circular fluid chambers 27-1 and 27-2 at the beginning of the brake operation is reduced compared to a structure in which a check valve is provided inside the cylinder body 3. As a result, loads applied to the first, second, third and fourth seal portions S1, S2, S3, and S4 are reduced, thus durability of the first, second, third and fourth seal portions S1, S2, S3, and S4 is increased and leakage thereat is prevented.

The second check valve 26 is arranged inside the sleeve 28. Therefore, the second check valve 26 is preliminarily assembled inside the sleeve 28 and in such a state, the sleeve 28 is arranged inside the first master cylinder 8-1. As a result, assembling of the hydraulic brake apparatus is simplified.

The throttle 25 is formed with the outer circumference of the sleeve 28, therefore, radial sizes of the first piston 8-1 and the hydraulic brake apparatus are prevented from enlarging.

The second check valve 26 includes the second valve seat 26a, the second valve body 26b and the stopper 26c, therefore, the structure of the second check valve is simplified and the size thereof is reduced, as a result, the second check valve 26 is easily assembled at the sleeve 28.

The second valve body 26b is structured so as to receive a movement regulation by means of the stopper 26c at a position to which the second valve body 26b is moved so as to correspond to the connecting holes 31 (see FIG. 3A). Therefore, in such a position the first passage 23 surrounding the second valve body 26b is fluidly connected via the clearances formed between the connecting holes 31 and the second valve body 26b at a movement restricted position. Accordingly, a large clearance may not need to be formed between an outer circumference of the second valve body 26b and the inner circumference of the sleeve 28 for the communication of the brake fluid therethrough. Thus, the diameter of the sleeve 28 is further prevented from enlarging.

[Second Embodiment]

Figure 4A:
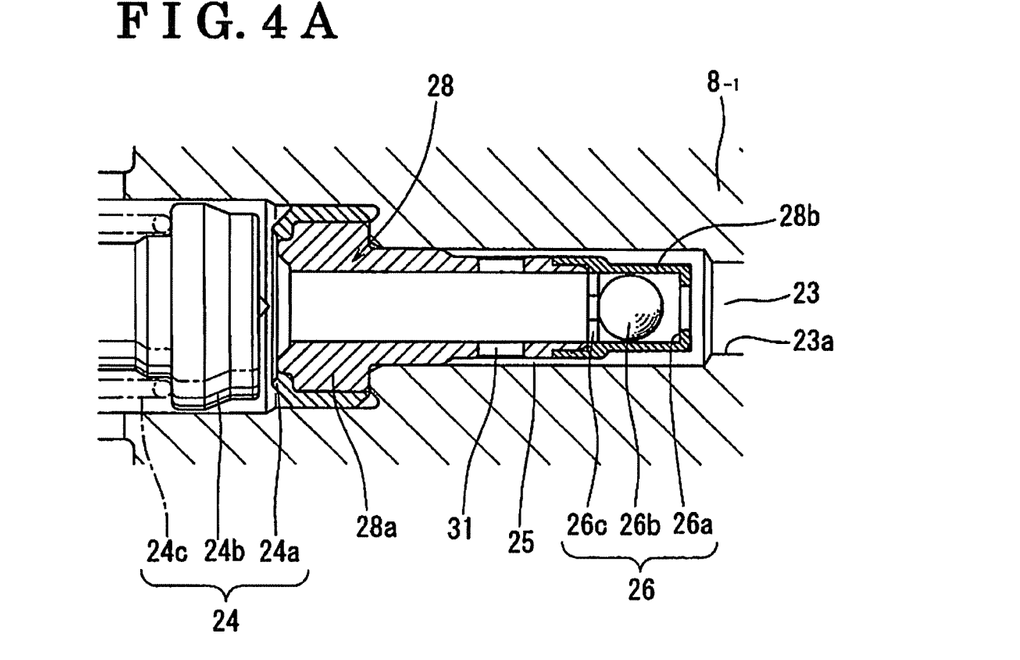
FIG. 4A is a cross-sectional view illustrating the throttle and the first and second check valves provided inside the master cylinder according to a second embodiment.
Figure 4B:
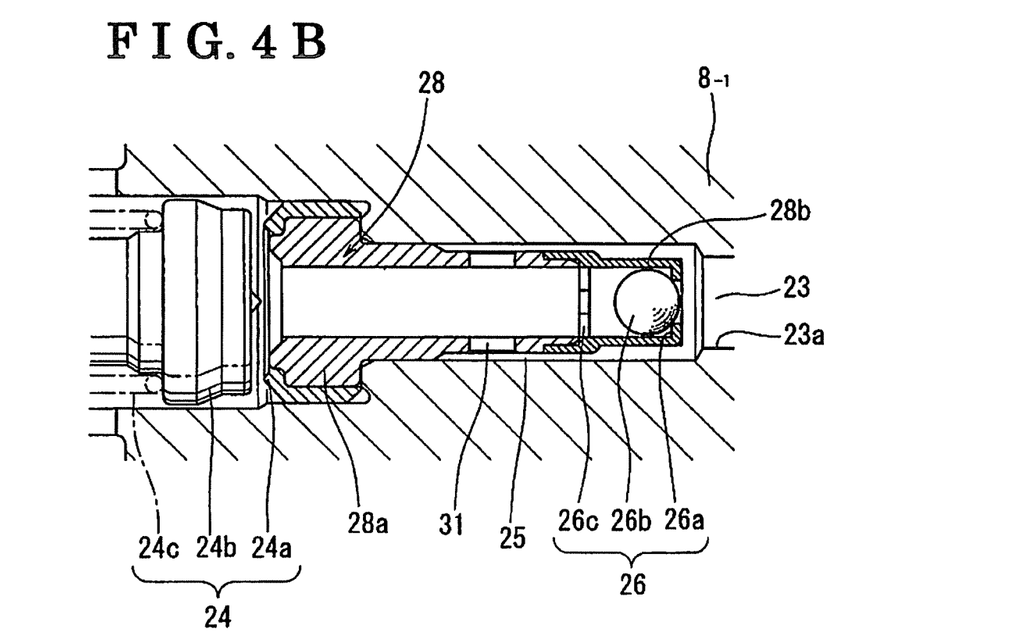
FIG. 4B is a cross-sectional view illustrating the first and second check valves illustrated in FIG. 4A when being closed according to the second embodiment.

FIGS. 4A and 4B illustrate another example of the throttle 25 and the second check valve 26 which are features of the present invention according to second embodiment of the present invention. As illustrated in FIGS. 4A and 4B, the sleeve 28 includes a sleeve body 28a and a cylindrical cap 28b which is attached at a back portion of the sleeve body 28. The second valve seat 26a, the second valve body 26b and the stopper 26c are provided inside the cylindrical cap 28b, so that the second check valve 26, which is set as a unit beforehand, is assembled to the sleeve body 28a, therefore, the second check valve 26 is easily assembled to the sleeve body 28a. The other structures of the second embodiment, other than the throttle 25, the second check valve 26 and the cylindrical cap 28b, are substantially the same as that of the first embodiment. The manner of assembling the first piston 8-1, the sleeve 28 and the second check valve 26 is substantially the same as that of the first embodiment described in accordance with FIG. 3 where, the sleeve 28 is fluid-tightly inserted into the main hole 23a provided at the first piston 8-1, the second check valve 26 is provided inside the back portion of the sleeve 28, and the throttle 25 is formed with the clearance generated between the outer circumference of the back portion of the sleeve 28 and the inner circumference of the main hole 23a. Such structures according to the second embodiment are substantially the same as that of the first embodiment and advantages (i.e. the assembling is simplified, and the enlargement of the apparatus is prevented) obtained in such structure according to the second embodiment are also substantially the same as that of the first embodiment.

[Third Embodiment]

Figure 5A:
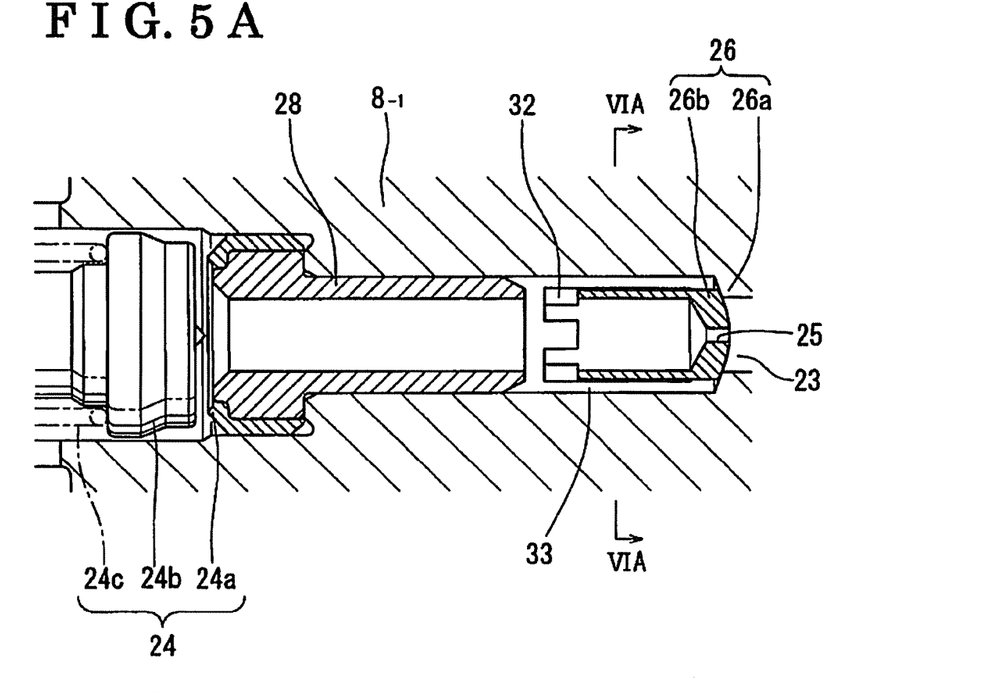
FIG. 5A is a cross-sectional view illustrating the throttle and the first and second check valves provided inside the master cylinder when closed according to a third embodiment.
Figure 5B:
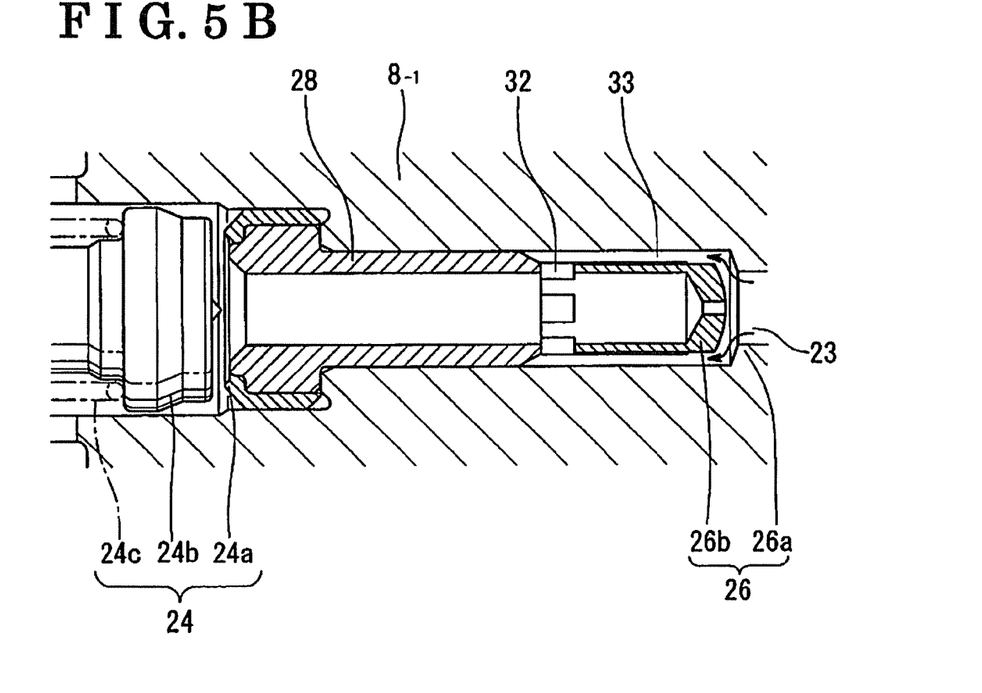
FIG. 5B is a cross-sectional view illustrating the first and second check valves illustrated in FIG. 5A when being opened according to the third embodiment.
Figure 6A:
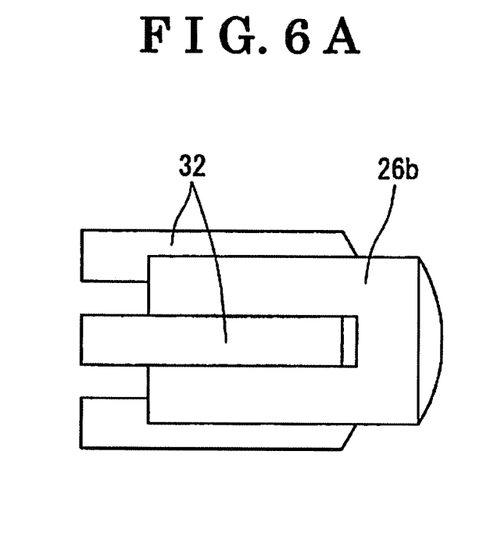
FIG. 6A is a side view illustrating a second valve body of the second check valve according to the third embodiment.
Figure 6B:
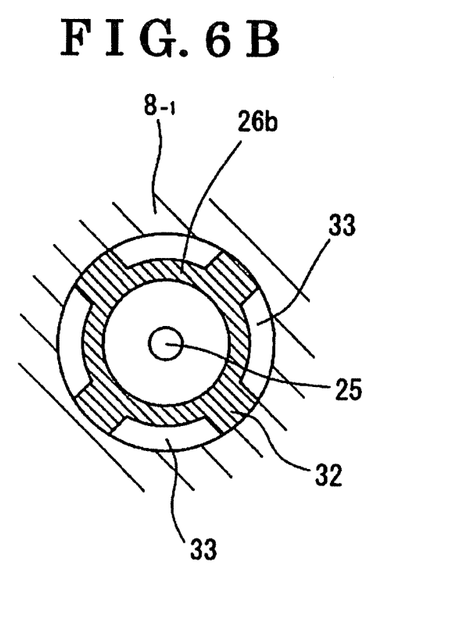
FIG. 6B is a cross-sectional view taken along line VIA-VIA in FIG. 5A according to the third embodiment.

FIGS. 5A, 5B, 6A and 6B illustrate another example of the throttle 25 and the second check valve 26 according to the third embodiment. The throttle 25 is formed at the second valve body 26b of the second check valve 26. As illustrated in FIG. 6A, the second valve body 26b of the second check valve 26 is formed in a cylindrical shape which has a base portion and a through hole is provided at the base portion of the second valve body 26b as the throttle 25. An outer diameter of the second valve body 26b is formed to be narrower than an inner diameter of a portion of the first passage 23 where the second valve body 26b is assembled. A plurality of sliding guides 32 protruding in a radial direction of the second valve body 26b are provided at an outer circumference of the second valve body 26b so as to be spaced away from each other.

The sliding guides 32 for guiding the second valve body 26b slide along the portion of the first passage 23 where the second valve body 26b is assembled.

As illustrated in FIGS. 5A and 5B, the second valve body 26b is provided in the vicinity of the back portion of the sleeve 28 so as to be more distant from the pressure chamber 10 than the back portion of the sleeve 28 and a seat surface (a spherical surface is suitable for the seat surface because such surface ensures sealing) of the second valve body 26b formed at an rear outer circumference of the base portion thereof moves so as to contact and move away from the second valve seat 26a, thus, a moving direction of the brake fluid traveling through the first passage 23 is controlled. As FIG. 5B illustrates, a second passage 33 is formed between the outer circumference of the second valve body 26b and inner circumferences of the first passage 23, so that the brake fluid flowing in a direction indicated by arrows in FIG. 5B moves through the second passage 33 from the reservoir 4 to the pressure chamber 10. Further, as illustrated in FIG. 5A, when the second valve body 26b contacts the second valve seat 26a to close the second check valve 26, the through hole provided at the base portion of the second valve body 26b functions as the throttle 25. Because of an orifice effect produced by the throttle 25, the fluid pressure inside the pressure chamber 10 for each predetermined operation stroke is increased and the responsiveness of the pressure control valve 11 is improved.

In the structure illustrated in FIGS. 5A and 5B, the back portion of the sleeve 28 (i.e. right side portion of the sleeve 28 in FIGS. 5A, 5B) restricts a moving amount of the second valve body 26b in a direction where the second check valve opens. Therefore, a stopper for restricting the moving amount of the second valve body 26b is not necessarily provided, thus, the structure and processes of manufacturing the second check valve 26 are simplified. Further, the through hole of the third embodiment provided at the base portion of the second valve body 26b functions as the throttle 25 of the first and second embodiments. Therefore, advantages which are described hereinbelow are obtained. Securing a dimension of the throttle 25 in such a structure is easier compared to that of the throttle 25 illustrated in FIGS. 3A, 3B, 4A and 4B because the throttle 25 illustrated in FIGS. 5A and 5B is formed at one portion while the throttle 25 illustrated in FIGS. 3A, 3B, 4A and 4B is formed between two portions, which are a rear outer circumference of the sleeve 28 and an inner circumference of the main hole 23a. By forming the second valve body 26b in the cylindrical shape having the base portion, weight of the second valve body 26b is reduced. Further, the cylinder-shaped second valve body 26b receives the flow of the brake fluid, therefore, the closing operation of the second valve body 26 becomes sensitive.

[Forth Embodiment]

Figure 7:
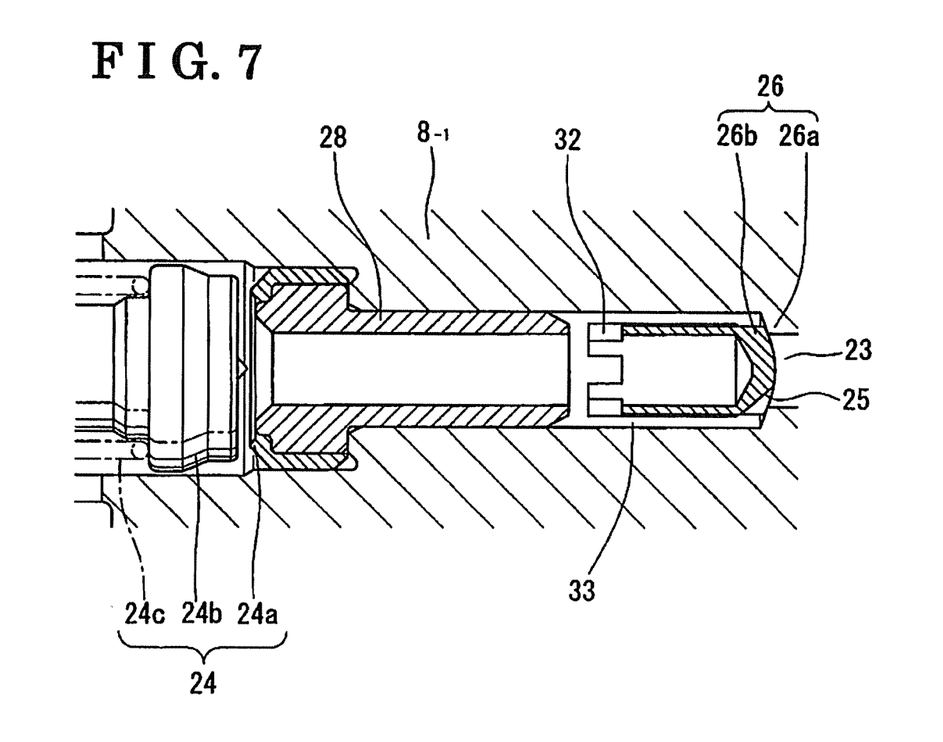
FIG. 7 is a cross-sectional view illustrating the throttle formed at a seat surface of the second valve body of the second check valve according to a fourth embodiment.

FIG. 7 illustrates another example of the throttle 25, which is provided at the second check valve 26, is formed by a groove according to the forth embodiment. In the forth embodiment, the groove provided at the seat surface (a surface which contacts the second valve seat 26a) of the second valve body 26b of the second check valve 26 functions as the throttle 25. The same advantages which are illustrated in FIGS. 5A and 5B are obtained in such a structure. Further, the second valve body 26b may be made of either metal or resin. However, in the above-described structure, in which the groove is formed at the second valve body 26b, a function of the throttle 25 is achievable without forming the through hole at the second valve body 26b. Therefore, specifically when the second valve body 26b is manufactured by metal pressing, drilling for forming the through hole is not needed, thus, productivity is improved.

In a case where the groove functions as the throttle 25, the groove may be provided at the second valve seat 26a, however, when provided at the second valve seat 26b, the through hole and the groove are easily manufactured.

Thus, the throttle 25 and the second check valve 26 are provided at the second valve body 26b or the second valve seat 26a. The hydraulic brake apparatus having the above-described structure is reduced in size and simplified. Further, in a structure in which the second check valve 26 is provided inside the sleeve 28, the throttle 25 may be formed at the second valve body 26b or the second valve seat 26a if the second valve body 26b of the second check valve 26 is structured so as to be stably positioned inside the sleeve 28.

[Fifth Embodiment]

FIG. 8 illustrates the basic circuit structure as described above. As illustrated in FIG. 8, the structure of the second check valve 26 and the throttle 25 may be modified as follows, where the branch hole 23b of the first passage 23 is divided into first and second branch holes and the throttle 25 and the second check valve 26 are provided at the first and second branch holes, respectively. The structures illustrated in FIGS. 3A, 3B, 4A, 4B, 5A, 5B, 6A, 6B and 7 have advantages of being easily manufactured and downsized, however, when the throttle 25 and the check valve, which allows the brake fluid to travel only from the reservoir 4 to the pressure chamber 10, are hydraulically provided in parallel with each other at the first passage 23 at a position between the switching valve 26 and the reservoir 4, the operation stroke before the wheel cylinders 6-1, 6-2, 6-3 and 6-4 are pressurized is shortened.

The groove functioning as the throttle 25 may be provided at the second valve seat 62a, however, the groove provided at the second valve body 26b is easier to be manufactured than the groove provided at the second valve seat 26a.

Figure 9:
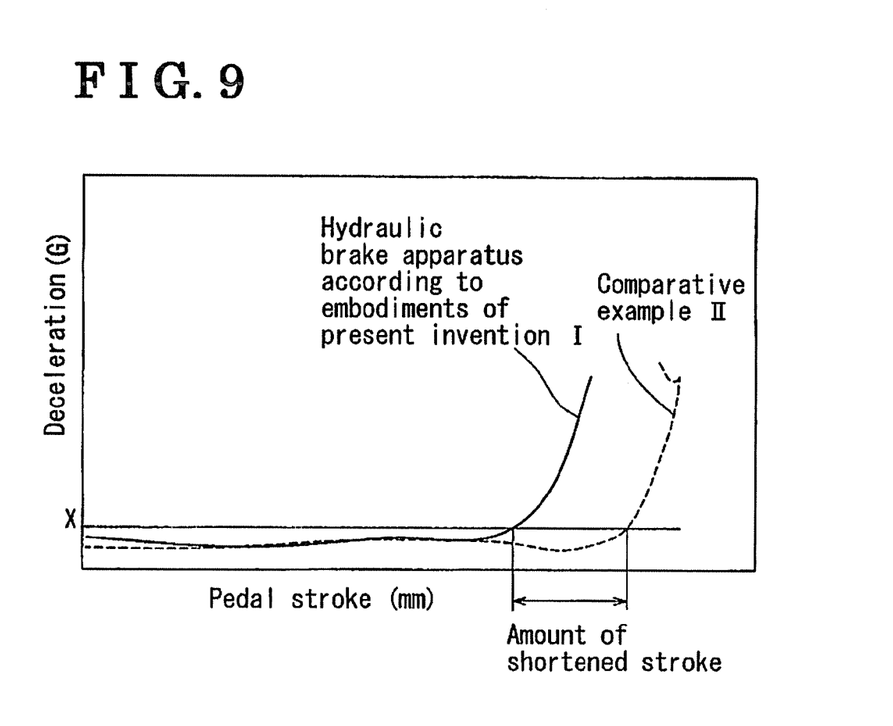
FIG. 9 is a graph illustrating a result of an experiment on shortening effect of stroke of a brake operation member.

FIG. 9 illustrates results of an experiment on a stroke shortening effect where the operation stroke of the vehicle having the hydraulic brake apparatus according to the embodiments of the present invention I, in which the throttle 25 and the second check valve 26 are hydraulically provided in parallel with each other at the first passage 23 provided at the first piston 8-1, is compared to the operation stroke of another vehicle having the conventional hydraulic brake apparatus (Comparative example II), in which the throttle 25 and the second check valve 26 are not provided at the first passage 23.

In the above-described experiment, a relationship between a rate of deceleration of the vehicle and the operation stroke of the brake pedal, necessary to stop the vehicle when the brake pedal is quickly depressed while the vehicle is traveling at a predetermined driving speed, is researched. A Roman numeral I in FIG. 9 represents measured data of the hydraulic brake apparatus according to the embodiments of the present invention and a roman numeral II represents measured data of the hydraulic brake apparatus of the comparative example. As is apparent from the results of the experiment, the amount of the operation stroke of the brake pedal necessary to reach a predetermined deceleration value X from the initial operation differs between the hydraulic brake apparatus I according to the embodiments of the present invention and comparative example II. More specifically, the operation stroke of the hydraulic brake apparatus according to the embodiments of the present invention I is shortened by approximately 30% relative to that of the compared hydraulic brake apparatus.

Further, according to the above-described embodiments, the master cylinder piston 8 includes the first and second pistons 8-1 and 8-2, however, a scope of the present invention embraces a hydraulic brake apparatus having a master cylinder piston which is structured with a single piston.

Still further, according to the above-described embodiments, the second valve body 26b of the second check valve 26 is a valve body which is not biased by a spring, however, the second valve body 26b may be biased against the second valve seat 26a by the spring in order to stably operate the second valve body 26b.

The hydraulic brake apparatus according to the present invention improves the conventional hydraulic brake apparatus in which, when the brake operation member 1 is operated fast, the brake fluid quickly flows from the pressure chamber 10 of the master cylinder 7 to the reservoir 4 via the first passage provided at the master cylinder 7, by the time the switching valve 24 closes. However, the hydraulic brake apparatus according to the present invention includes the throttle 25 and the second check valve 26 which are provided in parallel with each other inside the first passage 23 provided at the master cylinder piston 8. The second check valve 26 is closed by a pressure difference generated at the first passage 23, therefore the brake fluid traveling towards the reservoir 4 is led to pass through the throttle 25 and such generated orifice effect at the throttle 25 increases resistance of the brake fluid inside the pressure chamber 10, so that the hydraulic pressure inside the pressure chamber 10 for the each predetermined operation stoke is increased. As a result, the responsiveness of the pressure control valve 11 is improved and the non-effective stroke of the master cylinder 7 is reduced, therefore, the changes of the brake feeling occurring due to fluctuation in operation speed are restricted. Accordingly, when the brake operation member 1 is operated fast, the driver may not feel that the brake is not responding to his/her operation at the initial operation or that the brake is responding to his/her operation with delay.

Accordingly, in a case where the driving assist force of the master cylinder piston 8 is generated, the non-effective stroke of the master cylinder piston 8 is shortened and pressurization at wheel cylinders 6-1, 6-2, 6-3 and 6-4 in response to pressurization at the master cylinder piston 8 is improved at the initial operation, therefore, the brake is effectively operated and brake stopping distance is shortened.

According to the embodiments, the throttle means 25 and the check valve 26 are provided at a position between the first seal portion S1 sealing an outer front end circumference of the master cylinder piston 8 and the second seal portion S2 sealing an outer rear end circumference of the master cylinder piston 8, in the forward and rearward directions of the master cylinder piston 8.

According to the embodiments, the master cylinder piston 8 includes a first piston 8-1 connecting the master cylinder piston 8 to the brake operation member 1 and a second piston 8-2 fitted fluid-tightly at an outer circumference of the first piston 8-1 so as to be slidable in the axial direction thereof, wherein a back portion of the second piston 8-2 faces a power chamber 12 into which the controlled hydraulic pressure is outputted from the pressure control valve 11 and wherein the second piston 8-2 engages with the first piston 8-1 when the master cylinder piston 8 is moved in a forward direction towards the pressure chamber 10. Accordingly, the operation stroke necessary to pressurize the wheel cylinders 6-1, 6-2, 6-3 and 6-4 is shortened without increasing the output hydraulic pressure of the pressure control valve 11 in response to the output hydraulic pressure of the master cylinder. Therefore, an enlargement of a size of the cylinder body is prevented. Further, the master cylinder 7 having the switching valve 24, a so-called center valve, already includes the first passage 23 and the switching valve 24, therefore, by providing the throttle 25 and the second check valve 26, complex structure, enlargement of the size and increase of cost are prevented.

According to the embodiments, the first passage 23 includes a main hole 23a provided at a center portion of the first piston 8-1 so as to form an opening portion at a front end portion of the first piston 8-1 facing the pressure chamber 12 and a branch hole 23b extending from the main hole 23a to the outer circumferential surface of the first piston 8-1 in a radial direction of the first piston 8-1, and wherein the brake fluid flows between the branch hole 23b and the reservoir 4 via first and second circular fluid chambers 27-1 and 27-2 provided at outer circumferences of the first and second pistons 8-1 and 8-2, respectively.

According to the embodiments, the hydraulic brake apparatus further includes a sleeve 28, having one end facing the pressure chamber 10 and the other end, inserted fluid-tightly into the main hole 23a, wherein the switching valve 24 includes a first valve seat 24a formed at one end of the sleeve, a first valve body 24b provided so as to move towards and away from the first valve seat 24a and a biasing means 24c applying closing force to the first valve body 24b.

According to the embodiments, the check valve 26 is provided at a rear of the sleeve 28 so as to be movable in the forward and rearward directions of the master cylinder piston 8 so that the other end of the sleeve 28 restricts a moving amount of a second valve body 26b in a direction in which the check valve 26b opens.

According to the embodiments, the second check valve 26 is provided in the sleeve 28.

According to the embodiments, the hydraulic brake apparatus further includes a clearance 25 formed between a rear outer circumference of the sleeve 28 and an inner circumference of the main hole 23a so as to function as the throttle 25, and a connecting hole 31, which is connected to the clearance, provided at the sleeve 28 at a position hydraulically between the check valve 26 and the pressure chamber 10.

According to the embodiments the second check valve 26 includes a second valve seat 26a provided at an inner surface of the other end portion of the back portion of the sleeve 28, the second valve body 26b opening and closing a passage between the second valve seat 26a and the second valve body 26b, and a stopper 26c restricting a moving amount of the second valve body 26b in a direction in which the check valve opens.

According to the embodiments, the sleeve 28 includes a sleeve body 28a and a cylindrical cap 28b which is attached at a rear of the sleeve body 28a, and wherein the second valve seat 26a, the second valve body 26b and the stopper 26c are provided in the cylindrical cap 28b.

According to the embodiments, the second valve body 26b is structured so as to receive a movement regulation by means of the stopper 26c at a position, to which the second valve body 26b is moved and corresponding to the connecting hole 31, so that the first passage 23 surrounding the second valve body 26b is hydraulically connected via a clearance formed between the connecting holes 31 and the second valve body 26b at a movement restricted position.

According to the embodiments, the branch hole 23b of the first passage 23 is divided into first and second branch holes and the throttle means 25 and the second check valve 26 are provided at the first and second branch holes 23b, respectively.

According to the embodiments, the throttle 25 is provided at one of the second valve body 26b and the second valve seat 26a.

According to the embodiments, the second valve body 26b of the second check valve 26 is formed in a cylindrical shape which has a base portion, and a through hole is provided at the base portion of the second valve body 26b as the throttle 25.

According to the embodiments, the second valve body 26b of the second check valve 26 includes a groove provided at the seat surface thereof so as to function as the throttle 25.

According to the embodiments, an outer diameter of the second valve body 26b of the second check valve 26 is formed to be narrower than an inner diameter of a portion of the first passage 23 where the second valve body 26b is assembled, and wherein a plurality of sliding guides 32, sliding along the portion of the first passage 23 where the second valve body 26b is assembled, is provided at an outer circumference of the second valve body 26b so as to be spaced away from each other, so that a second passage 33, for communicating the brake fluid from the reservoir 4 to the pressure chamber 10, is formed between the outer circumference of the second valve body 26b and inner circumferences of the first passage 23 where the second valve body 26b is assembled.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A hydraulic brake apparatus, comprising:
   a master cylinder pressurizing brake fluid in a pressure chamber by means of a master cylinder piston so as to generate hydraulic pressure in response to an operation stroke of a brake operation member and outputting the hydraulic pressure to a wheel cylinder of a first brake circuit; and
   a pressure control valve controlling a hydraulic pressure of an auxiliary hydraulic pressure source in response to the hydraulic pressure in the pressure chamber and outputting the controlled hydraulic pressure to a wheel cylinder of a second brake circuit, wherein
   the master cylinder piston includes a first passage which hydraulically connects the pressure chamber and a reservoir, and a switching valve which closes the first passage when the master cylinder piston moves in a forward direction of pressurizing and which opens the first passage when the master cylinder piston returns in a rearward direction opposite from the forward direction, and wherein
   a check valve, which allows the brake fluid to travel only from the reservoir to the pressure chamber, and a throttle means, which are hydraulically provided in parallel with each other at the first passage at a position between the switching valve and the reservoir.

2. The hydraulic brake apparatus according to claim 1, wherein the throttle means and the check valve are provided at a position between a first seal portion sealing an outer front end circumference of the master cylinder piston and a second seal portion sealing an outer rear end circumference of the master cylinder piston, in the forward and rearward directions of the master cylinder piston.

3. The hydraulic brake apparatus according to claim 1, wherein the master cylinder piston includes
   a first piston connecting the master cylinder piston to the brake operation member and
   a second piston fitted fluid-tightly at an outer circumference of the first piston so as to be slidable in the axial direction thereof, wherein a back portion of the second piston faces a power chamber into which the controlled hydraulic pressure is outputted from the pressure control valve and wherein the second piston engages with the first piston when the master cylinder piston is moved in a forward direction towards the pressure chamber.

4. The hydraulic brake apparatus according to claim 3, wherein the first passage includes
   a main hole provided at a center portion of the first piston so as to form an opening portion at a front end portion of the first piston facing the pressure chamber and
   a branch hole extending from the main hole to the outer circumferential surface of the first piston in a radial direction of the first piston, and wherein
   the brake fluid flows between the branch hole and the reservoir via first and second circular fluid chambers provided at outer circumferences of the first and second pistons, respectively.

5. The hydraulic brake apparatus according to claim 4, further comprising a sleeve, having one end facing the pressure chamber and the other end, inserted fluid-tightly into the main hole, wherein the switching valve includes a valve seat of the switching valve formed at one end of the sleeve, a valve body of the switching valve provided so as to move towards and away from the valve seat of the switching valve and a biasing means applying closing force to the valve body of the switching valve.

6. The hydraulic brake apparatus according to claim 5, wherein the check valve is provided at a rear of the sleeve so as to be movable in the forward and rearward directions of the master cylinder piston so that the other end of the sleeve restricts a moving amount of a valve body of the check valve in a direction in which the check valve opens.

7. The hydraulic brake apparatus according to claim 5, wherein the check valve is provided in the sleeve.

8. The hydraulic brake apparatus according to claim 7, further comprising, a clearance formed between a rear outer circumference of the sleeve and an inner circumference of the main hole so as to function as the throttle means, and a connecting hole, which is connected to the clearance, is provided at the sleeve at a position hydraulically between the check valve and the pressure chamber.

9. The hydraulic brake apparatus according to claim 5, wherein the check valve includes
   a valve seat at an inner surface of the other end portion of the sleeve
   a valve body opening and closing a passage between the valve seat of the check valve and the valve body of the check valve, and
   a stopper restricting a moving amount of the valve body of the check valve in a direction in which the check valve opens.

10. The hydraulic brake apparatus according to claim 8, wherein the check valve includes
    a valve seat of the check valve provided at an inner surface of the other end portion of the sleeve
    the valve body of the check valve opening and closing a passage between the valve seat of the check valve and the valve body of the check valve, and
    a stopper restricting a moving amount of the valve body of the check valve in a direction in which the check valve opens.

11. The hydraulic brake apparatus according to claim 10, wherein the sleeve includes a sleeve body and a cylindrical cap which is attached at a rear of the sleeve body, and wherein the valve seat of the check valve, the valve body of the check valve and the stopper are provided in the cylindrical cap.

12. The hydraulic brake apparatus according to claim 10, wherein the valve body of the check valve is structured so as to receive a movement regulation by means of the stopper at a position, to which the valve body of the check valve is moved and corresponding to the connecting hole, so that the first passage surrounding the valve body of the check valve is hydraulically connected via a clearance formed between the connecting hole and the valve body of the check valve at a movement restricted position.

13. The hydraulic brake apparatus according to claim 4, wherein the branch hole of the first passage is divided into first and second branch holes and the throttle means and the check valve are provided at the first and second branch holes, respectively.

14. The hydraulic brake apparatus according to claim 1, wherein the throttle means is provided at one of the valve body of the check valve and the valve seat of the check valve.

15. The hydraulic brake apparatus according to claim 14, wherein the valve body of the check valve is formed in a cylindrical shape which has a base portion, and a through hole is provided at the base portion of the valve body of the check valve as the throttle means.

16. The hydraulic brake apparatus according to claim 14, wherein the valve body of the check valve includes a groove provided at the seat surface thereof so as to function as the throttle means.

17. The hydraulic brake apparatus according to claim 14, wherein an outer diameter of the valve body of the check valve is formed to be narrower than an inner diameter of a portion of the first passage where the valve body of the check valve is assembled, and wherein a plurality of sliding guides, sliding along the portion of the first passage where the valve body of the check valve is assembled, is provided at an outer circumference of the valve body of the check valve so as to be spaced away from each other, so that a second passage, for communicating the brake fluid from the reservoir to the pressure chamber, is formed between the outer circumference of the valve body of the check valve and inner circumferences of the sliding guides and the portion of the first passage where the valve body of the check valve is assembled.

18. A hydraulic brake apparatus, comprising:
    a master cylinder pressurizing brake fluid in a pressure chamber by movement of a master cylinder piston to generate hydraulic pressure in response to an operation stroke of a brake operation member and outputting the hydraulic pressure to a wheel cylinder of a first brake circuit;
    a pressure control valve controlling a hydraulic pressure of an auxiliary hydraulic pressure source in response to the hydraulic pressure in the pressure chamber and outputting the controlled hydraulic pressure to a wheel cylinder of a second brake circuit;
    the master cylinder piston including: a sleeve positioned in a hole in the master cylinder piston; a first passage in the master cylinder piston which opens into the hole and hydraulically connects the pressure chamber and a reservoir; and a switching valve which closes the first passage when the master cylinder piston moves in a forward direction of pressurizing and which opens the first passage when the master cylinder piston returns in a rearward direction opposite the forward direction;
    a check valve which allows the brake fluid to travel only from the reservoir to the pressure chamber;
    a clearance between an outer surface of the sleeve and an inner surface of the hole in the master cylinder piston, the clearance forming a throttle; and
    the throttle being hydraulically provided in parallel with the check valve at the first passage at a position between the switching valve and the reservoir.

19. The hydraulic brake apparatus according to claim 18, wherein the throttle and the check valve are positioned axially between a first seal portion and a second seal portion, wherein the first seal portion seals against an outer circumferential surface of the master cylinder piston at a front end of the master cylinder piston, and the second seal portion seals against an outer circumferential surface of the master cylinder piston toward a rear end of the master cylinder piston.

20. The hydraulic brake apparatus according to claim 18, wherein the check valve includes a valve seat at a rear end of the sleeve and a valve body positioned in the sleeve.

* * * * *